E. E. FIESELER.
ELECTRIC WATER LEVEL INDICATOR.
APPLICATION FILED MAR. 13, 1911.
1,005,111.
Patented Oct. 3, 1911.
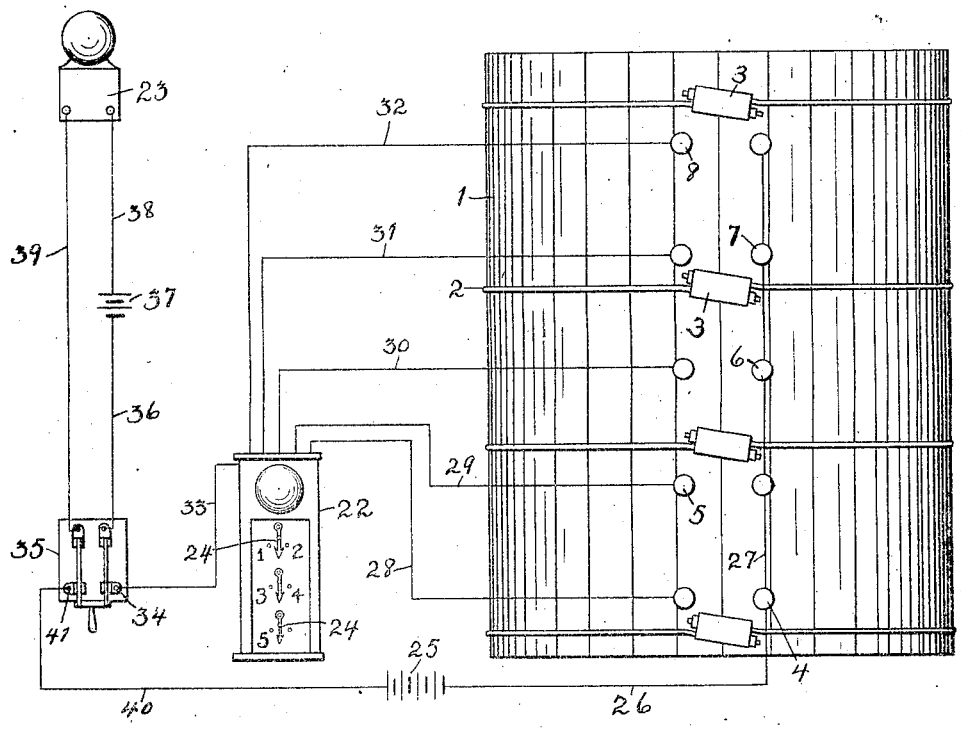
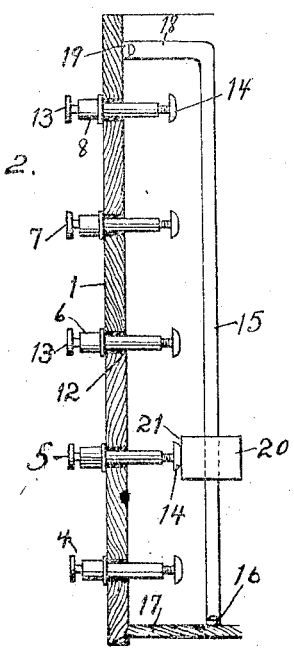
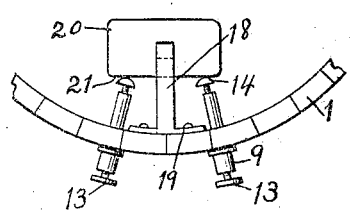
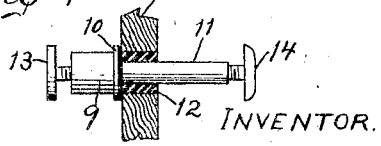
WITNESSES
G. Ferd. Vogt
A. C. Martin
INVENTOR
Edward E. Fieseler
By Mann & Co.
ATTORNEYS

UNITED STATES PATENT OFFICE.

EDWARD E. FIESELER, OF EASTPORT, MARYLAND, ASSIGNOR OF ONE-HALF TO ADAM E. MARTAK, OF EASTPORT, MARYLAND.

ELECTRIC WATER-LEVEL INDICATOR.

1,005,111. Specification of Letters Patent. Patented Oct. 3, 1911.

Application filed March 13, 1911. Serial No. 614,177.

*To all whom it may concern:*

Be it known that I, EDWARD E. FIESELER, a citizen of the United States, residing at Eastport, in the county of Anne Arundel and State of Maryland, have invented certain new and useful Improvements in Electric Water-Level Indicators, of which the following is a specification.

This invention relates to an improved electric water level indicator and has particular reference to an improved device for indicating the level of water in tanks.

The object of the invention is to provide a tank with an improved construction of water level indicator so that the approximate depth of water may be determined at a point remote from the tank and a signal may be sounded as the various levels of water in the tank are reached.

The invention consists in the novel construction, combination and arrangement of devices hereinafter set forth in the claims, and the accompanying drawing illustrates its application.

Figure 1, of the drawing shows an exterior elevation of a tank embodying the features of the invention and also shows the indicator and alarm devices and a diagrammatic arrangement of electrical connection between them. Fig. 2 shows a vertical sectional detail through the wall of the tank and also shows the terminals and the float for closing the circuit through the latter. Fig. 3, is a top plan view of a portion of the tank directly over the terminals and float, and Fig. 4, is an enlarged sectional detail showing the manner of securing the terminals in the tank wall.

Referring to the drawing the numeral, 1, designates a tank which may be constructed of wood, metal, concrete or any suitable material but which is shown as formed of wood, and in the present instance has a plurality of encircling hoops, 2, whose ends are held by suitable devices, 3, that are well-known to the trade and therefore not shown in detail. The tank is provided with a plurality of stems that extend through the wall thereof from the outer to the inner side and said stems are arranged in spaced-apart pairs with one pair above another. In the form shown the tank has five pairs of stems designated by the numerals 4, 5, 6, 7 and 8 respectively,—the pair of stems, 4, being the lowermost and the pair of stems, 8, the highest in the tank. The stems of each pair are arranged in the same horizontal plane between the bottom and top of the tank so that each pair of stems may form terminals of an electric circuit as will presently be more fully described.

By referring to Fig. 4, it will be seen that each stem or terminal has an enlarged outer end, 9; a collar, 10, and a reduced inner end, 11, which is circular in cross-section. Suitable insulating material, 12, is provided between the stem and the tank so as to insulate the stems from each other and also from the wall in case the latter is of a material that is a conductor of electrical current. A binding post, 13, screws into the outer enlarged end, 9, of the stem or terminal and an adjustable contact head, 14, is screwed into the reduced inner end, 11, of said stem. By preference the adjustable contact heads, 14, are beveled around their edges for a purpose presently to be explained.

By referring to Figs. 2 and 3 it will be seen that a guide bar, 15, which is square in cross-section extends vertically in the tank in a vertical plane between the spaced-apart pairs of stems or terminals,—the lower end of the bar having a lateral extension, 16, that rests upon and is secured to the bottom, 17, of the tank, and the upper end having a horizontal extension, 18, with lateral flanges, 19, that are secured to the tank wall above the stems or terminals. The guide bar, 15, is thus held rigidly in the tank and extends from a point above the highest pair of stems or terminals, 8, to a point below the lowest pair of stems or terminals, 4. A float, 20, is sustained on the guide bar, 15, and in the present instance this float has a passage extending therethrough from the upper to the lower side that conforms to the cross-sectional shape and permits the passage of the bar, 15, so that said float may move vertically on the bar and rise and fall with the water in the tank. The float has a contact wall, 21, that is preferably formed of metal, but obviously any electrical conductor on the float that will simultaneously brush over the contact heads, 14, of the stems or terminals may be employed.

In carrying out the invention I make use of an annunciator mechanism, 22, of well-known construction which may be located at any convenient point where it may readily be under observation or accessible and I also prefer to make use of a signal device, 23, which I desire to place near the pump or other device that controls the supply of water to the tank as and for a purpose presently to be more fully disclosed. In the present instance the annunciator mechanism employs a plurality of usual characters and the usual pivoted hands, 24, to coact therewith and as five pairs of terminals are employed on the tank in the present illustration, the annunciator will be provided with a like number of characters, thus providing an indicating character on the annunciator for each pair of terminals on the tank.

By reference to Fig. 1 it will be noted that a battery, 25, is provided to supply the current and that one side of said battery is connected by a wire, 26, with one terminal of the lowermost pair of terminals, 4, and that a wire, 27, extends from said terminal and electrically connects the same with one terminal of each of the pairs of terminals, 5, 6, 7 and 8. Thus it will be seen that one terminal of each pair of terminals is electrically connected by wires, 27, and, 26, with one side of the battery, 25. The other terminals of each pair are connected by wires 28, 29, 30, 31 and 32 respectively with the annunciator mechanism in such a way that the respective hands, 24, will be actuated to point to a character on the annunciator corresponding to the terminal with which it is connected and by this means indicate at which terminal the circuit has been established through the float. A wire, 33, extends from the annunciator mechanism, 22, and connects the same with a binding post, 34, of a knife switch, 35, while another wire, 36, leads from said switch and connects the latter with one side of a battery, 37. A bell, 23, is located at any desired point and preferably near the pump or other point where the supply to the tank is controlled so as to sound an alarm each time the circuit is closed through any pair of terminals and one post of said bell is electrically connected to battery, 37, by means of a wire, 38. A return wire, 39, connects the outer post of the bell, 23, with the switch, 35, and a wire, 40, extends from post, 41, of said switch and connects with the battery, 25.

Supposing the tank to be empty the filling thereof with liquid by means of a pump or other means of supply will operate as follows:—The float, 20, will move upwardly on the bar, 15, because it will remain on the surface of the liquid and as it moves vertically its wall, 21, will rub against the spaced-apart contact heads, 14, of each pair of terminals and thus close the circuit by forming a current-carrying connection between said terminal heads. By this means the circuit through the respective pairs of terminals will be successively closed as the liquid level in the tank rises and the annunciator hands for each pair of terminals will be actuated as the float closes the circuit through the latter, thereby indicating the height of liquid in the tank. If the liquid in the tank has fallen so that the level will be somewhere between the terminals, 4, and, 5, an attendant will be informed of this fact by examining the annunciator because the hands will have been actuated as the float moves down on the surface of the water. It will also be known to a person who is to again fill the tank that when bell, 23, next sounds, after the filling operation has been started that the liquid will have raised the float to terminals, 5, and then upon sounding again the float will have reached the terminals, 6, and so on until the tank is practically full, when the filling operation will be discontinued.

I am aware of the fact that water is supposed to be a conductor of electricity and while this may be true in many instances I have found by actual practice of the apparatus herein shown that water does not in this case conduct the current from one set of terminals to another or from one terminal of a pair to the other terminal of the same pair of terminals and that with the apparatus shown the operation is precisely as described and that the annunciator and signal devices are not operated until the float forms the contacts between the terminals.

Having thus described my invention what I claim and desire to secure by Letters Patent is,—

1. In an electric liquid level indicator the combination with a tank, of a plurality of electric terminals extending through the wall of the tank and exposed on the interior of the latter,—said terminals having positions in different horizontal planes between the bottom and top of the tank; an annunciator mechanism having an indicator for each terminal; electrical connections between the respective terminals and their respective annunciator indicators; a rod extending vertically within the tank; a float movable on said rod and parallel with a plane passing through the ends of the terminals; a battery; connections between the annunciator and one side of the said battery and connections between the other side of the battery and the float.

2. In an electric liquid level indicator the combination with a tank, of a plurality of electric terminals extending through the wall of the tank in spaced-apart pairs and the terminals of one pair being exposed on the interior of the tank in a horizontal plane above the terminals of another pair; a rod extending vertically in the tank between the spaced-apart pairs of terminals; a float on said rod and having a contact to engage the spaced-apart ends of a pair of terminals at a time; a battery; connections between one side of the battery and one terminal of each pair of terminals; an annunciator having an indicator for each pair of terminals; a connection between a pair of terminals and its indicator of the annunciator; and connections between the other side of the battery and the annunciator mechanism.

In testimony whereof I affix my signature in presence of two witnesses.

EDWARD E. FIESELER.

Witnesses:
CHARLES B. MANN, Jr.,
G. FERD. VOGT.